United States Patent
Yamaguchi et al.

(10) Patent No.: US 7,246,596 B2
(45) Date of Patent: Jul. 24, 2007

(54) CONTROL SYSTEM FOR INTERNAL COMBUSTION ENGINE

(75) Inventors: Satoshi Yamaguchi, Wako (JP); Mamoru Hasegawa, Wako (JP); Naoto Kitayama, Wako (JP); Hideki Sakamoto, Wako (JP); Yoshihiro Itoh, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/545,672

(22) Filed: Oct. 11, 2006

(65) Prior Publication Data

US 2007/0084435 A1   Apr. 19, 2007

(30) Foreign Application Priority Data

Oct. 13, 2005 (JP) .............................. 2005-298276
Dec. 15, 2005 (JP) .............................. 2005-361302

(51) Int. Cl.
*G01N 33/22* (2006.01)
*F02B 3/12* (2006.01)

(52) U.S. Cl. .................. 123/299; 123/1 A; 123/406.3; 73/35.02

(58) Field of Classification Search ............... 123/299, 123/1 A, 406.3; 73/35.02
See application file for complete search history.

(56) References Cited

U.S. PATENT DOCUMENTS 5,457,985 A * 10/1995 Cellier et al. .............. 73/35.02
6,155,101 A * 12/2000 Renault et al. ............ 73/35.02
6,314,944 B1 * 11/2001 Majima ..................... 123/1 A
6,609,413 B1 * 8/2003 De Craecker .............. 73/35.02
6,684,153 B2 * 1/2004 Wada ......................... 701/114
7,028,532 B2 * 4/2006 Shinzawa ................... 73/35.02
7,201,138 B2 * 4/2007 Yamaguchi et al. ..... 123/406.3
2007/0044759 A1 * 3/2007 Yamaguchi et al. ..... 123/406.3
2007/0079647 A1 * 4/2007 Aoyama ..................... 73/35.02

FOREIGN PATENT DOCUMENTS

JP   2005-171818 A   6/2005

* cited by examiner

*Primary Examiner*—Erick Solis
(74) *Attorney, Agent, or Firm*—Arent Fox LLP

(57) ABSTRACT

A control system for an internal combustion engine that has at least one fuel injection valve for injecting fuel into a combustion chamber of the engine, and burns the injected fuel by compressing an air-fuel mixture in the combustion chamber. An operating condition of the engine and/or a refueling condition of a fuel tank for supplying fuel to the engine are/is detected. At least one operating parameter of the engine is changed when at least one of the engine operating condition and the refueling condition detected by the condition detecting means satisfies a predetermined condition in a predetermined low load operating condition of the engine. A cetane number of the fuel in use is estimated according to an ignition timing of the fuel detected after changing the at least one operating parameter of the engine.

18 Claims, 11 Drawing Sheets

FIG. 5
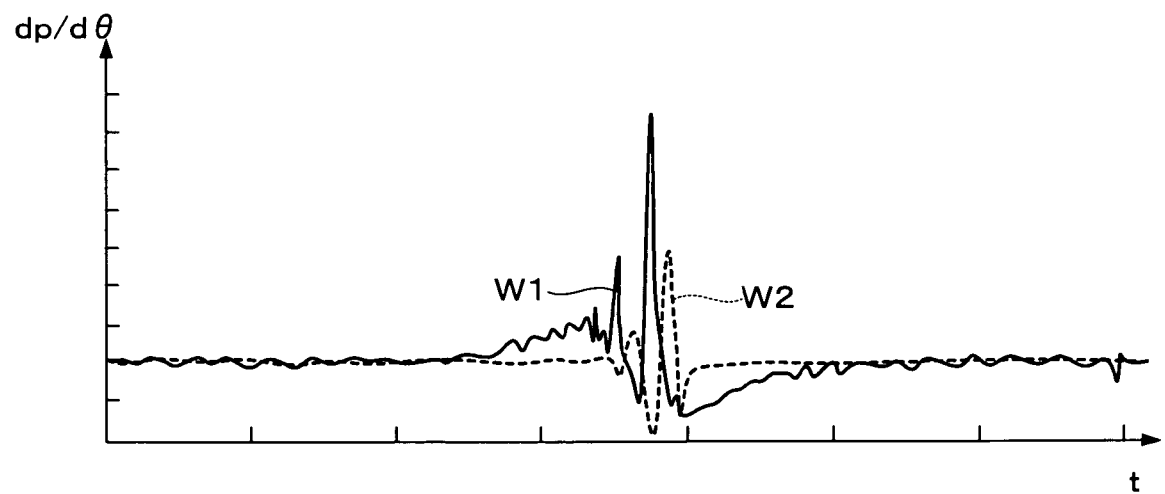
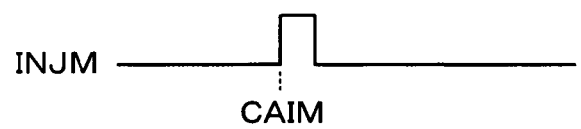
FIG. 6A
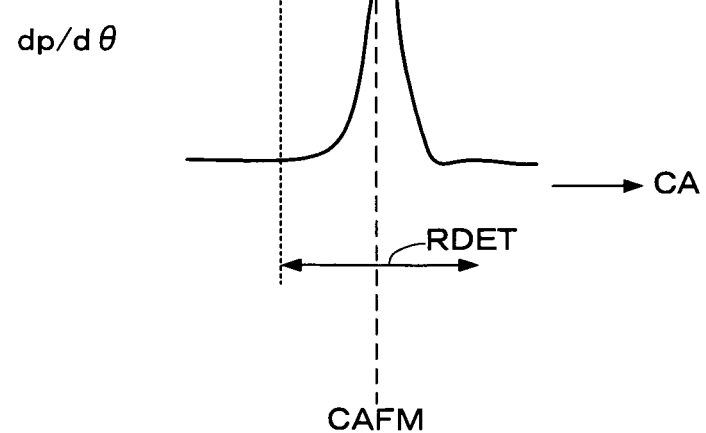
FIG. 6B

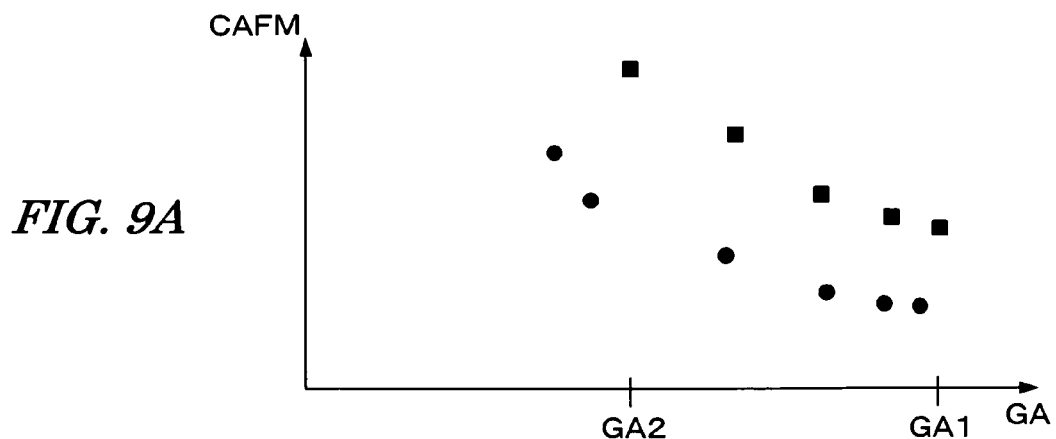
FIG. 9A
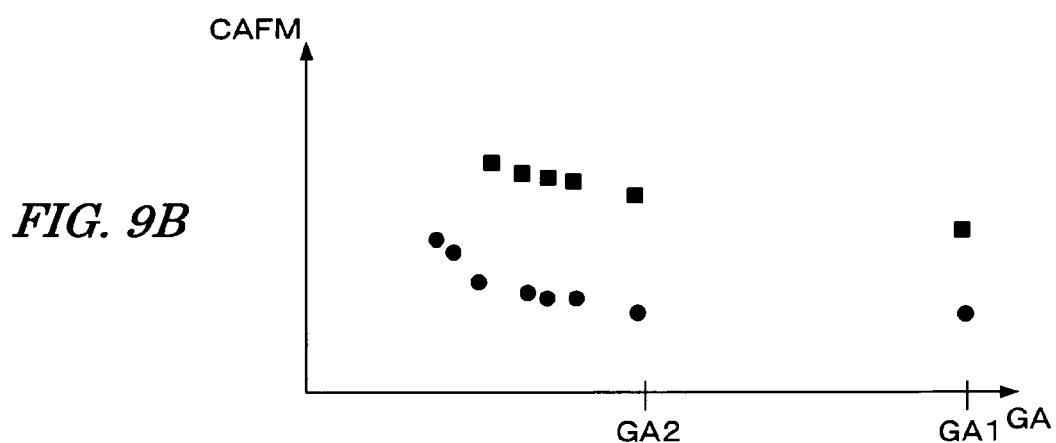
FIG. 9B
FIG. 10
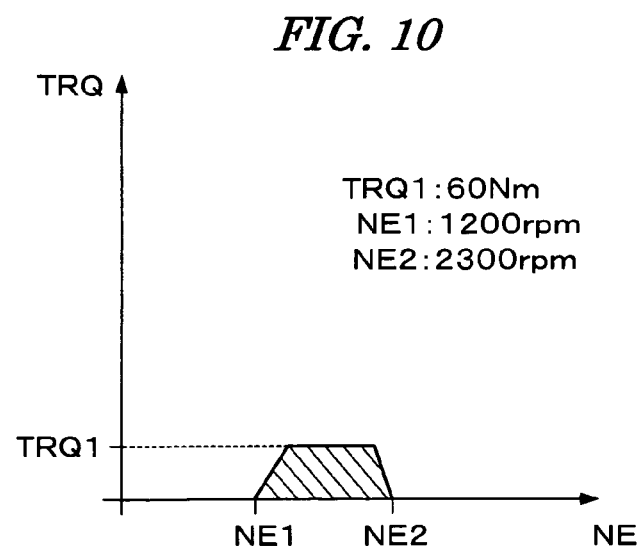

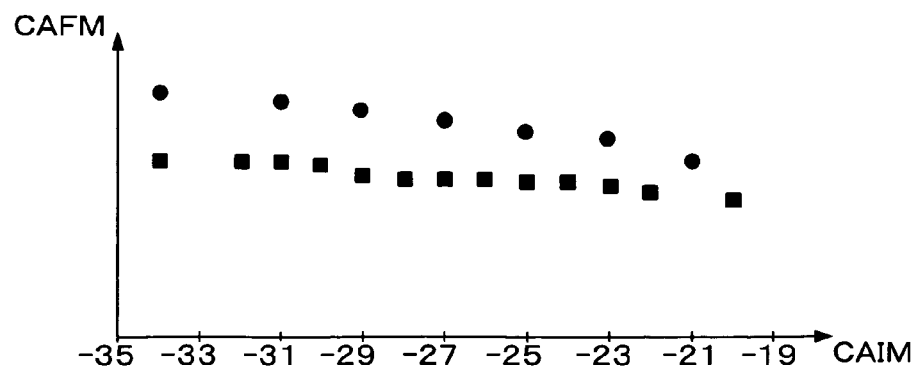
FIG. 16A
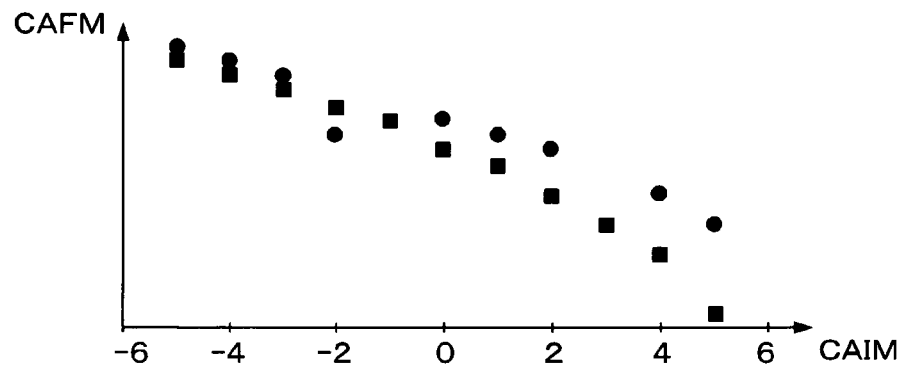
FIG. 16B
FIG. 17
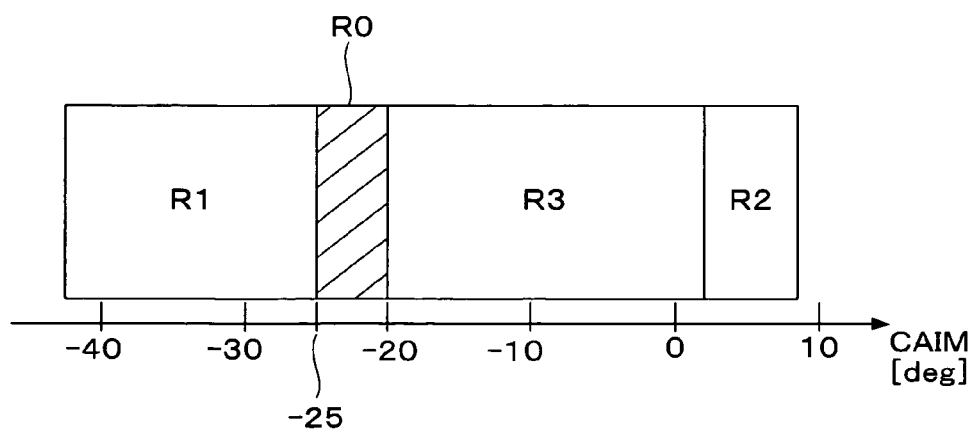

CONTROL SYSTEM FOR INTERNAL COMBUSTION ENGINE

BACKGROUND OF THE INVENTION

1. Field of the Invention

The present invention relates to a control system for an internal combustion engine, and particularly, to a control system for a compression ignition internal combustion engine which burns an air-fuel mixture in a combustion chamber by compressing the air-fuel mixture.

2. Description of the Related Art

Japanese Patent Laid-open No. 2005-171818 (JP '818) discloses a control system for a compression ignition internal combustion engine in which premix combustion is performed. According to the control system disclosed by JP '818, an actual ignition timing of fuel is detected during the premix combustion, and the properties of the fuel in use are determined according to an ignition timing error and differences in the ignition timing errors, the ignition timing error being a difference between the actual ignition timing and a previously set reference ignition timing.

The engine operating region, where the premix combustion is performed, is, for example, a hatched region shown in FIG. 10. The hatched region is comparatively narrow relative to the entire engine operating region. Therefore, an execution timing in determining the fuel property is delayed, wherein the fuel injection is performed at a timing not suitable in view of the fuel property, such that a misfire may occur.

SUMMARY OF THE INVENTION

The present invention was attained in view of the above-described point, and an aspect of the present invention is to provide a control system for an internal combustion engine which quickly and accurately determines a property, i.e., the cetane number, of the fuel in use.

To attain the above-described aspect, the present invention provides a control system for an internal combustion engine having a fuel injection means for injecting fuel to a combustion chamber of the engine and burning the fuel by compressing an air-fuel mixture in the combustion chamber. The control system includes condition detecting means, fuel injection control means, operation control means, and cetane number estimating means. The condition detecting means detects an operating condition (TE, TOIL, TW) of the engine and/or a refueling condition of a fuel tank which supplies fuel to the engine. The fuel injection control means controls the fuel injection means. The operation control means changes at least one operating parameter (NINJ, CAIM) of the engine when at least one of the operating condition and the refueling condition, detected by the condition detecting means, satisfies a predetermined condition in a predetermined low load operating condition of the engine. The cetane number estimating means estimates a cetane number (CET) of the fuel in use according to an ignition timing (CAFM) of the fuel detected after changing the at least one engine operating parameter.

With the above-described structural configuration, when at least one of the detected engine operating condition and the refueling condition satisfies the predetermined condition in the predetermined low load operating condition of the engine, the at least one engine operating parameter is changed and the cetane number of the fuel in use is estimated according to the ignition timing of the fuel detected after changing the at least one engine operating parameter.

By changing a value of the engine operation parameters to a value suitable for the cetane number estimation, the cetane number estimation is performed in the predetermined low load operating condition. Consequently, the cetane number of the fuel in use can be determined quickly and accurately.

Preferably, the fuel injection control means performs a plurality of fuel injections for each, that is, one, combustion cycle in each, that is, one, cylinder, and the operation control means decreases the number of fuel injections that are performed when the predetermined condition is satisfied.

With the above-described structural configuration, when the predetermined condition is satisfied, the number of fuel injections that are performed is reduced which makes it possible to accurately detect the delay of the ignition timing.

Preferably, the operation control means changes a timing (CAIM) of the fuel injection performed by the fuel injection means when the predetermined condition is satisfied.

With the above-described structural configuration, when the predetermined conditions are satisfied, the fuel injection timing is changed. The change in the fuel injection timing increases an amount of change in the ignition timing due to the difference in the cetane number, thereby improving the accuracy of the estimated cetane number.

Preferably, the control system further includes wall surface temperature condition determining means for determining a wall surface temperature condition, wherein a wall surface temperature (TWALL) of the combustion chamber is in a predetermined temperature range (TWALL<TWLTH) during a predetermined low load operating condition. The predetermined condition includes the wall surface temperature condition.

With the above-described structural configuration, it is determined whether the wall surface temperature condition, wherein the wall surface temperature of the combustion chamber in the predetermined low load operating condition, is in the predetermined temperature range. The cetane number estimation is performed when the wall surface temperature condition is satisfied. When a high load operation is performed immediately before the engine operating condition shifts to the predetermined low load operating condition, the wall surface temperature of the combustion chamber becomes high and the ignition timing shifts in the advancing direction compared with the normal condition. Therefore, estimation of the cetane number cannot accurately be performed. By involving the wall surface temperature condition in the predetermined condition such a problem is avoided and accurate estimation of the cetane number is performed.

Preferably, the wall surface temperature condition determining means includes initial wall surface temperature estimating means and gradually reducing means. The initial wall surface temperature estimating means estimates an initial wall surface temperature (TWALL) based on the engine operating condition immediately before the engine operating condition shifts to the predetermined low load operating condition. The gradually reducing means gradually reduces the initial wall surface temperature (TWALL) after the engine operating condition shifts to the predetermined low load operating condition. The wall surface temperature condition determining means determines that the wall surface temperature condition is satisfied when the temperature output from the gradually reducing means is in the predetermined temperature range.

With the above-described structural configuration, the initial wall surface temperature is estimated immediately before the engine operating condition shifts to the predetermined low load operating condition. Also, the estimated wall surface temperature is obtained by gradually reducing the initial wall surface temperature after the engine operating condition shifts to the predetermined low load operating condition. When the estimated wall surface temperature is in the predetermined temperature range, the wall surface temperature condition is determined to be satisfied. Therefore, the wall surface temperature condition is accurately determined according to the engine operating condition immediately before shifting to the predetermined low load operating condition.

Alternatively, the wall surface temperature condition determining means includes initial wall surface temperature estimating means and waiting time period setting means. The initial wall surface temperature estimating means estimates an initial wall surface temperature (TWALL) based on the engine operating condition immediately before the engine operating condition shifts to the predetermined low load operating condition. The waiting time period setting means sets a waiting time period (TWAIT) according to the wall surface temperature. The waiting time period is a time period extending from the time the engine operating condition shifts to the predetermined low load operating condition to the time the wall surface temperature condition is satisfied. The wall surface temperature condition determining means determines the wall surface temperature condition is satisfied when the waiting time period has elapsed from the time the engine operating condition shifts to the predetermined low load operating condition.

With the above-described structural configuration, the initial wall surface temperature is estimated according to the engine operating condition immediately before the engine operating condition shifts to the predetermined low load operating condition. Also, the waiting time period from shifting to the predetermined low load operating condition to the satisfaction of the wall surface temperature condition, is set according to the initial wall surface temperature. When the waiting time period has elapsed, the wall surface temperature condition is determined to be satisfied. If the elapsed waiting time period reaches the set waiting time period, the wall surface temperature is considered to be in the predetermined temperature range. Consequently, the wall surface temperature condition is accurately determined according to the engine operating condition immediately before the shift to the predetermined low load operating condition.

Preferably, when the predetermined is satisfied, the operation control means reduces a target engine rotational speed in the predetermined low load operating condition and/or reduces an intake air flow rate of the engine.

The present invention further provides another control system for an internal combustion engine having a fuel injection means for injecting fuel into a combustion chamber of the engine and burning the injected fuel by compressing an air-fuel mixture in the combustion chamber. The control system includes fuel injection control means, actual ignition timing detecting means, and cetane number estimating means. The fuel injection control means controls the fuel injection means. The actual ignition timing detecting means detects an actual ignition timing of the fuel injected by the fuel injection means. The cetane number estimating means estimates a cetane number of the fuel in use according to the detected ignition timing. The fuel injection control means sets a fuel injection timing (CAIM) of the fuel injection means so that a difference ($\Delta$CACET) in the actual ignition timings due to a difference in cetane numbers of the fuel is equal to or greater than a predetermined value ($\Delta$CATH) when the cetane number estimating means performs the cetane number estimation.

With the above-described structural configuration, when the cetane number estimation is performed, the fuel injection timing is set so that the difference in the actual ignition timings due to the difference in cetane numbers of the fuel is equal to or greater than the predetermined value. Accordingly, the cetane number of the fuel is accurately estimated.

Preferably, the fuel injection control means sets the fuel injection timing (CAIM) of the fuel injection means so that an amount (THC) of hydrocarbon emitted from the engine is equal to or less than a predetermined amount (THCLH) when the cetane number estimating means performs the cetane number estimation.

With the above-described structural configuration, when estimating the cetane number, the fuel injection timing is set so that the amount of hydrocarbon emitted from the engine is equal to or less than the predetermined amount. Accordingly, the emission amount of hydrocarbon is suppressed.

Preferably, when the cetane number estimating means performs the cetane number estimation, the fuel injection control means sets the fuel injection timing (CAIM) of the fuel injection means in a range of the crank angle from 20 to 25 degrees before a crank angle at which a piston corresponding to the combustion chamber reaches the top dead center.

With the above-described structural configuration, the fuel injection is set in the range of the crank angle from 20 to 25 degrees before the crank angle at which the piston reaches the top dead center when performing the cetane number estimation. Accordingly, the cetane number estimation is accurately performed while suppressing the emission amount of hydrocarbon.

BRIEF DESCRIPTION OF THE DRAWINGS

FIG. 5 is a time chart illustrating the band pass filtering of the cylinder pressure sensor output;

FIGS. 6A-6B show time charts used for detecting the ignition timing;

FIGS. 9A-9B show relationships between the intake air flow rate (GA) and the ignition timing (CAFM);

FIG. 10 shows a premix combustion region;

FIGS. 16A-16B show relationships between the fuel injection timing (CAIM) and the actual ignition timing (CAFM'); and FIG. 17 illustrates a setting range (R0) of the fuel injection timing that is suitable for the cetane number estimation process.

DETAILED DESCRIPTION OF THE PREFERRED EMBODIMENTS

Preferred embodiments of the present invention will now be described with reference to the drawings.

First Embodiment

Figure 1:
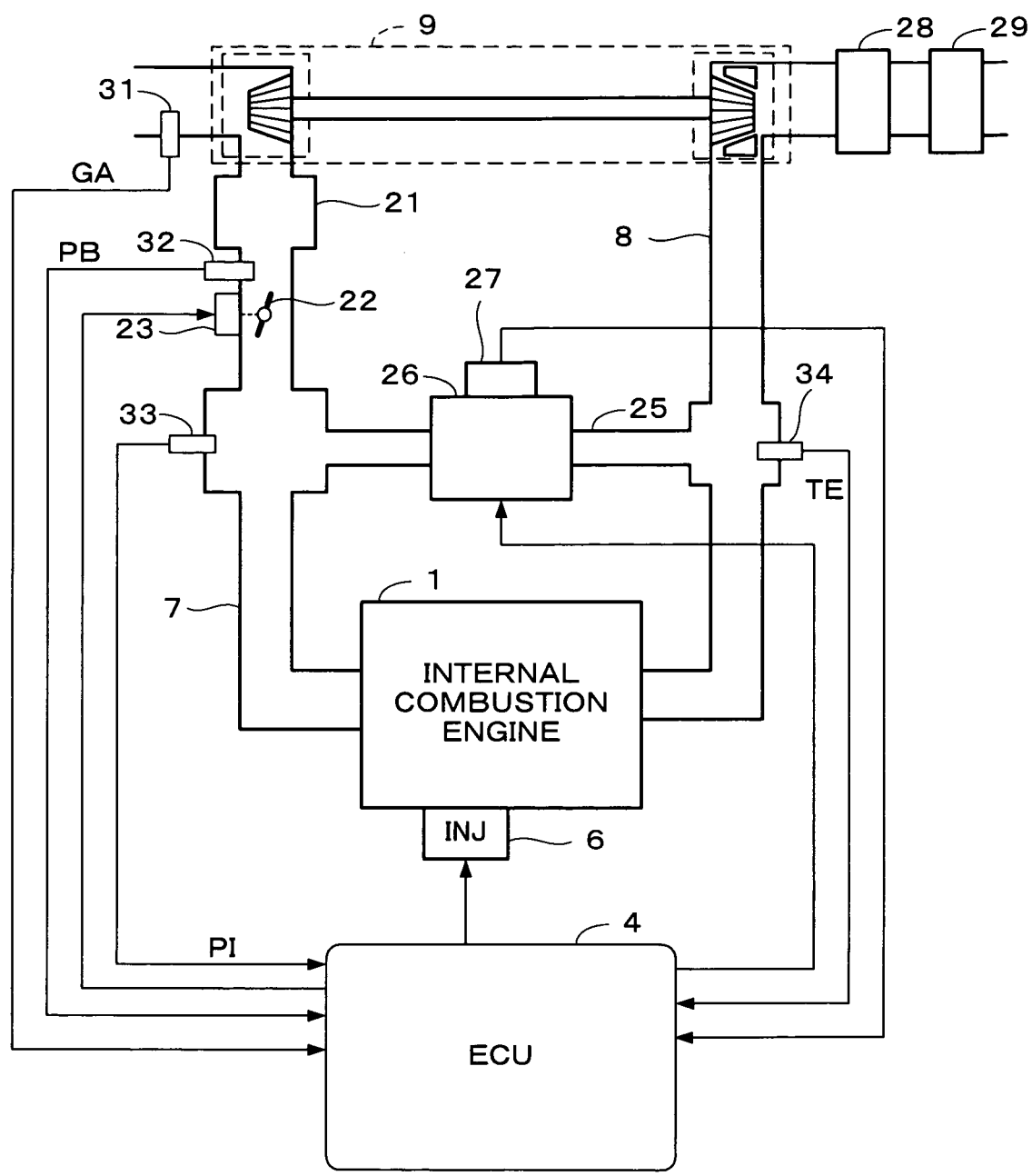
FIG. 1 is a schematic diagram showing an internal combustion engine and a control system therefor according to a first embodiment of the present invention.
Figure 2:
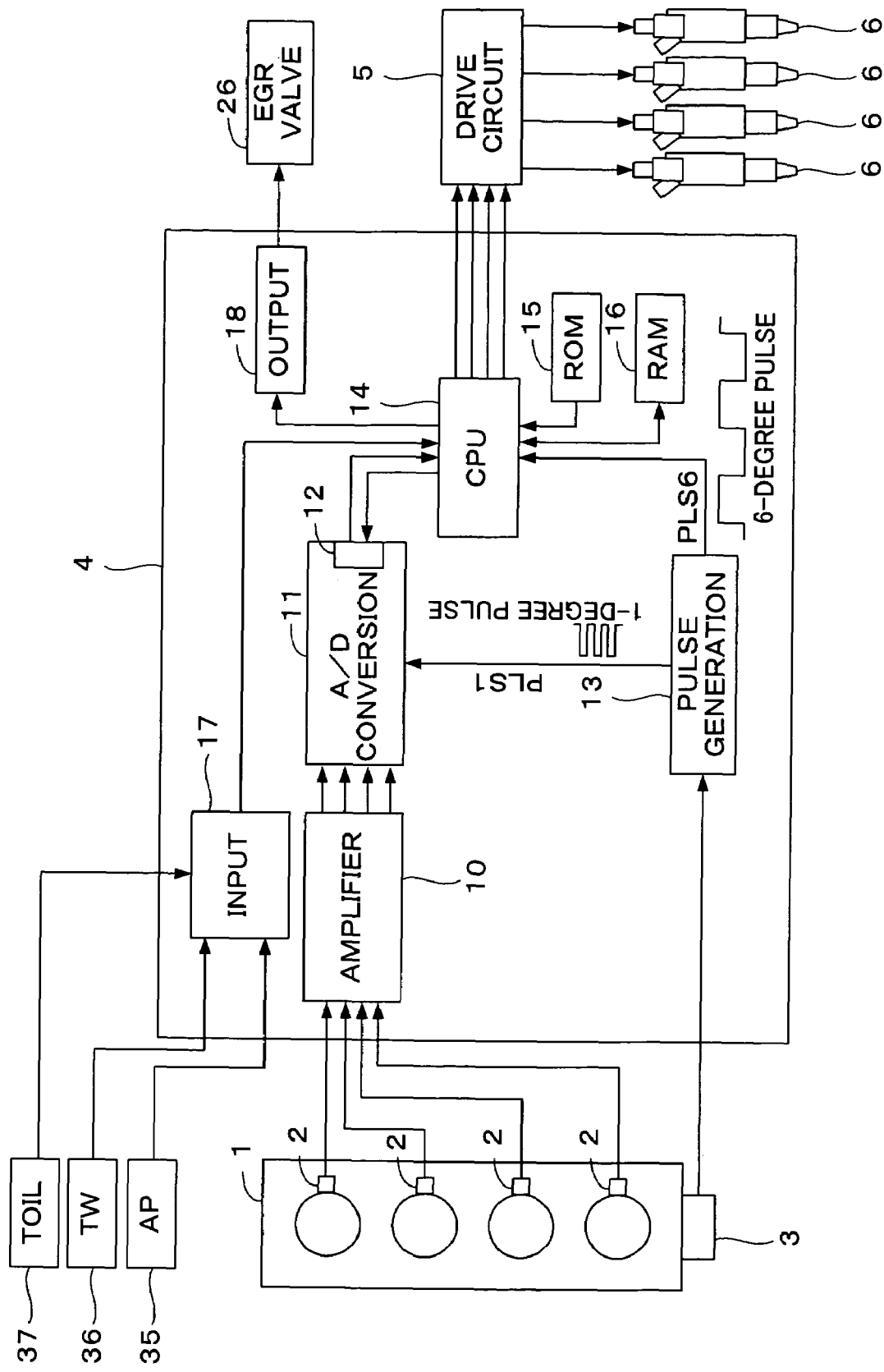
FIG. 2 shows a configuration of a part of the control system shown in FIG. 1.

FIGS. 1 and 2 are schematic diagrams showing a configuration of an internal combustion engine and a control system therefor according to a first embodiment of the present invention. The internal combustion engine 1 (hereinafter referred to as "engine") is a diesel engine wherein fuel is injected directly into the cylinders. Each cylinder is provided with a fuel injection valve 6 electrically connected to an electronic control unit 4 (hereinafter referred to as "ECU 4"). The ECU 4 controls a valve opening timing and a valve opening period of each fuel injection valve 6. That is, the fuel injection timing and fuel injection period are controlled by the ECU 4.

The engine 1 has an intake pipe 7, an exhaust pipe 8, and a turbocharger 9. The turbocharger 9 includes a turbine and a compressor connected to the turbine through a shaft. The turbine is rotationally driven by the kinetic energy of exhaust gases. The turbocharger 9 pressurizes (compresses) the intake air of the engine 1.

An intercooler 21 is provided downstream of the compressor in the intake pipe 7, and a throttle valve 22 is provided downstream of the intercooler 21. The throttle valve 22 is configured to be opened and closed by an actuator 23 connected to the ECU 4. Accordingly, the ECU 4 controls opening of the throttle valve 22 through the actuator 23.

An exhaust gas recirculation passage 25 for recirculating exhaust gases to the intake pipe 7 is provided between the exhaust pipe 8 and the intake pipe 7. The exhaust gas recirculation passage 25 is provided with an exhaust gas recirculation valve 26 (hereinafter referred to as "EGR valve") that controls the amount of exhaust gases that are recirculated. The EGR valve 26 is an electromagnetic valve having a solenoid. A valve opening of the EGR valve 26 is controlled by the ECU 4. The EGR valve 26 is provided with a lift sensor 27 for detecting the valve opening (valve lift) LACT of the EGR valve 26, wherein a detection signal of the lift sensor 27 is supplied to the ECU 4. The exhaust gas recirculation passage 25 and the EGR valve 26 define an exhaust gas recirculation mechanism.

The intake pipe 7 is provided with an intake air flow rate sensor 31 for detecting an intake air flow rate GA, a boost-pressure sensor 32 for detecting an intake pressure (boost pressure) PB on the downstream side of the compressor, and an intake pressure sensor 33 for detecting an intake pressure P1. The exhaust pipe 8 is provided with an exhaust gas temperature sensor 34 for detecting an exhaust gas temperature TE. The sensors 31 to 34 are connected to the ECU 4. The detection signals of the sensors 31 to 34 are supplied to the ECU 4.

A catalytic converter 28 and a particulate filter 29 are provided downstream of the turbine in the exhaust pipe 8. The catalytic converter 28 accelerates oxidization of hydrocarbon, and the like, in the exhaust gases, and the particulate filter 29 traps particulate matter which mainly consists of soot.

Each cylinder of the engine 1 is provided with a cylinder pressure sensor 2 for detecting a cylinder pressure, i.e., a pressure in the combustion chamber of the engine 1. In this embodiment, the cylinder pressure sensor 2 is configured in one body together with the spark plug disposed in each cylinder. The detection signal of the cylinder pressure sensor 2 is supplied to the ECU 4. It is to be noted that the detection signal of the cylinder pressure sensor 2 corresponds to a differential signal of the cylinder pressure PCYL with respect to the crank angle (time), and the cylinder pressure PCYL is obtained by integrating the output of the cylinder pressure sensor.

The engine 1 is provided with a crank angle position sensor 3 for detecting a rotation angle of the crankshaft (not shown). The crank angle position sensor 3 generates one pulse at every 1 degree of the crank angle, wherein the pulse signal is then supplied to the ECU 4. The crank angle position sensor 3 further generates a cylinder discrimination pulse at a predetermined crank angle of a specific cylinder of the engine 1 and supplies the cylinder discrimination pulse to the ECU 4.

An accelerator sensor 35 for detecting an operation amount AP of the accelerator pedal of the vehicle driven by the engine 1, a coolant temperature sensor 36 for detecting a coolant temperature TW of the engine 1, an oil temperature sensor 37 for detecting a lubricating oil temperature TOIL of the engine 1, an oxygen concentration sensor (not shown) for detecting an oxygen concentration in the exhaust gases, an intake air temperature sensor (not shown) for detecting an intake air temperature TA of the engine 1, and the like, are connected to the ECU 4. The detection signals of the sensors 35-37 are supplied to the ECU 4.

The ECU 4 supplies a control signal of the fuel injection valve 6 provided in the combustion chamber of each cylinder of the engine 1 to a drive circuit 5. The drive circuit 5 is connected to the fuel injection valve 6 and supplies drive signals to the fuel injection valve 6 according to the control signal from the ECU 4. Fuel is thereby injected into the combustion chamber of each cylinder at the fuel injection timing in accordance with the control signal output from the ECU 4. The ECU 4 normally performs a pilot injection and a main injection in each cylinder.

The ECU 4 includes an amplifier 10, an A/D conversion block 11, a pulse generation block 13, a CPU 14 (Central Processing Unit), a ROM 15 (Read Only Memory) for storing programs executed by the CPU 14, a RAM 16 (Random Access Memory) for storing calculation results, etc., an input circuit 17, and an output circuit 18. The detection signal of the cylinder pressure sensor 2 is input to the amplifier 10. The amplifier 10 amplifies the input signal. The signal amplified by the amplifier 10 is input to the A/D conversion block 11. The pulse signal output from the crank angle position sensor 3 is input to the pulse generation block 13.

The A/D conversion block 11, which includes a buffer 12, converts the cylinder pressure sensor output from the amplifier 10 to a digital value $dp/d\theta$ (hereinafter referred to as "pressure change rate"), and stores the converted digital value in the buffer 12. Specifically, a pulse signal PLS1 (hereinafter referred to as "one-degree pulse") having a crank angle period of one degree is supplied to the A/D conversion block 11 from the pulse generation block 13, the cylinder pressure sensor output is sampled at the intervals of the one-degree pulse PLS1 to be converted to a digital value, and the digital value is stored in the buffer 12.

A pulse signal PLS6 having a crank angle period of six degrees is supplied to the CPU 14 from the pulse generation block 13. The CPU 14 performs a process for reading the digital value stored in the buffer 12 at intervals of the six-degree pulse PLS6. That is, in the present embodiment, the A/D conversion block 11 does not request an interrupt to the CPU 14, but the CPU 14 performs the reading process at intervals of the six-degree pulse PLS6.

The input circuit 17 converts the detection signals from various sensors to digital values and supplies the digital values to the CPU 14. An engine rotational speed NE is calculated from the time period of the six-degree pulse PLS6. A demand torque TRQ of the engine 1 is calculated according to the operation amount AP of the accelerator pedal.

The CPU 14 outputs control signals for controlling the throttle valve 22, the EGR valve 26, and the like, according to the engine operating condition through the output circuit 18. Further, the CPU 14 executes a process for estimating a cetane number of the fuel in use, as described below, and performs the fuel injection control according to the estimated cetane number.

Figure 3:
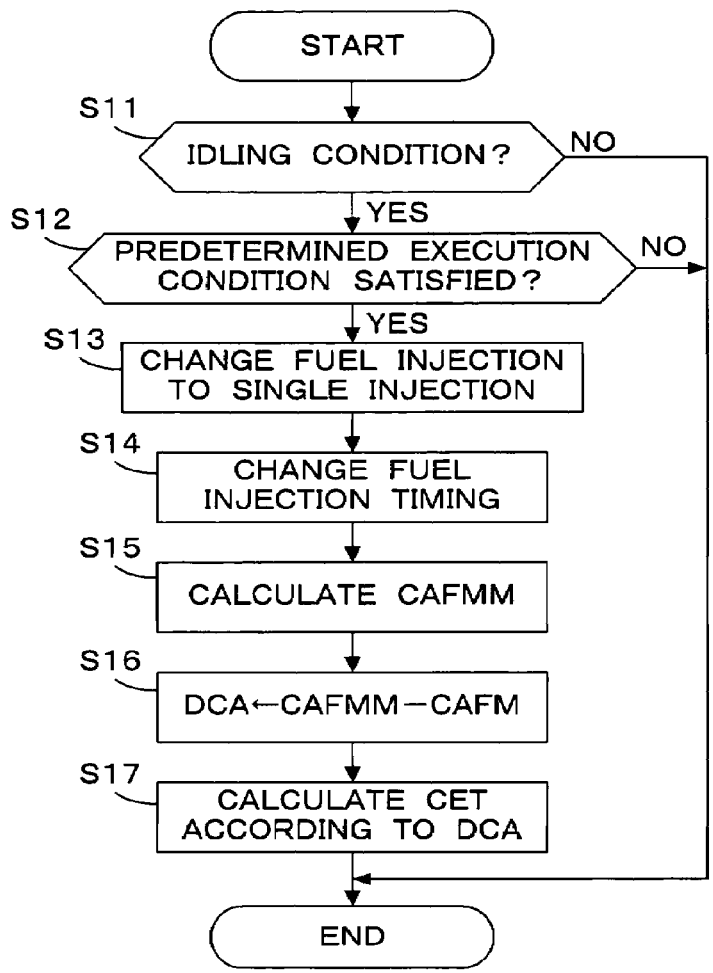
FIG. 3 is a flowchart showing a method of estimating the cetane number of the fuel in use.

FIG. 3 is a flowchart showing a method of estimating a cetane number. In step S11, it is determined whether the engine 1 is in the idling condition. If the answer to step S11 is affirmative (YES), it is determined whether a predetermined execution condition for stably performing the cetane number estimation is satisfied. The predetermined execution condition is satisfied, for example, when the exhaust temperature TE is equal to or greater than a predetermined temperature TE0 (e.g., about 90 degrees Centigrade) and the coolant temperature TW or the lubricating oil temperature TOIL, which indicates the warm-up condition of the engine 1, is equal to or greater than a predetermined temperature TWUP (e.g., 80 degrees Centigrade).

If the answer to step S11 or S12 is negative (NO), the process immediately ends without performing the cetane number estimation. If the predetermined execution condition is satisfied in step S12, the pilot injection is stopped and the single injection (only the main injection) is performed (step S13). That is, a number NINJ of fuel injections per 1 cylinder per 1 cycle is set to "1". Further, the main injection timing is changed in the advancing direction with respect to the normal injection timing (step S14). By changing the double injection to single injection and advancing the fuel injection timing with respect to the normal timing as described above, a difference in the ignition timing due to the difference in the cetane numbers is easily detected.

In step S15, a CAFMM map (not shown) is retrieved according to the engine rotational speed NE and the demand torque TRQ to calculate a reference ignition timing CAFMM. The CAFMM map is set based on a fuel of a high cetane number (e.g., 57). In step S16, an ignition delay angle DCA is calculated by subtracting an actual ignition timing CAFM from the reference ignition timing CAFMM.

Figure 4:
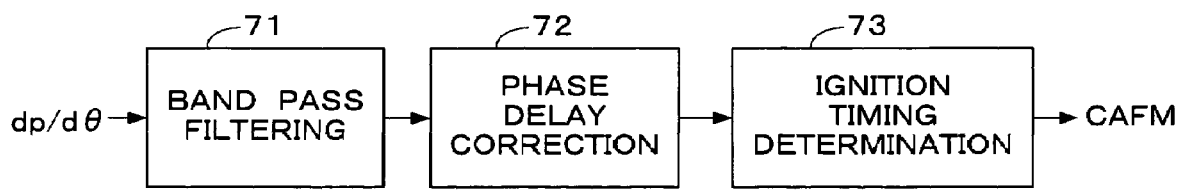
FIG. 4 is a block diagram showing a configuration of an ignition timing calculation module.

FIG. 4 is a block diagram showing a configuration of an ignition timing calculation module which calculates (detects) an actual ignition timing CAFM. The function of the ignition timing calculation module is realized by the process executed by the CPU 14. The ignition timing calculation module includes a band pass filtering block 71, a phase delay correction block 72, and an ignition timing determination block 73. The pressure change rate $dp/d\theta$ output from the cylinder pressure sensor 2 is input to the band pass filtering block 71. In FIG. 5, the waveform W1 shows an input waveform, and the waveform W2 shows an output waveform. The phase delay which occurs in the band pass filtering block 71 is corrected in the phase delay correction block 72.

The ignition timing determination block 73 determines that a crank angle position, at which the pressure change rate $dp/d\theta$ takes a peak value corresponding to the fuel injection, is the actual ignition timing CAFM. Specifically as shown in FIG. 6B, the crank angle position, at which the pressure change rate $dp/d\theta$ output from the phase delay correction block 72 exceeds a detection threshold value DPP, is determined to be the actual ignition timing CAFM.

In FIGS. 6A and 6B, an injection pulse INJM started from a crank angle position CAIM is shown. FIG. 6B shows an angle position range RDET (e.g., 10 degrees) where the actual ignition timing CAFM is detected. By limiting the detection angle position range RDET to a comparatively narrow range, as shown in FIG. 6B, the ignition timing is accurately determined without increasing calculation load of the CPU 14.

Figure 7:
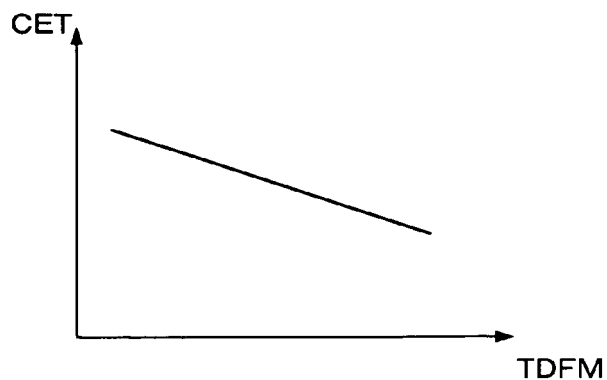
FIG. 7 shows a table for calculating the cetane number (CET) from the ignition delay time period (TDFM)

Referring back to FIG. 3, in step S17, the ignition delay angle position DCA is converted to an ignition delay time period TDFM using the engine rotational speed NE. A CET table, which is shown in FIG. 7, is retrieved according to the ignition delay time period TDFM to calculate the cetane number CET.

According to the process of FIG. 3, if the predetermined execution condition is satisfied in the idling condition, the fuel injection timing is changed in the advancing direction and the fuel injection is changed from the double injection to the single injection. Accordingly, the cetane number can be estimated in the idling condition, thereby quickly and accurately determining the cetane number of the fuel in use.

Figure 11A:
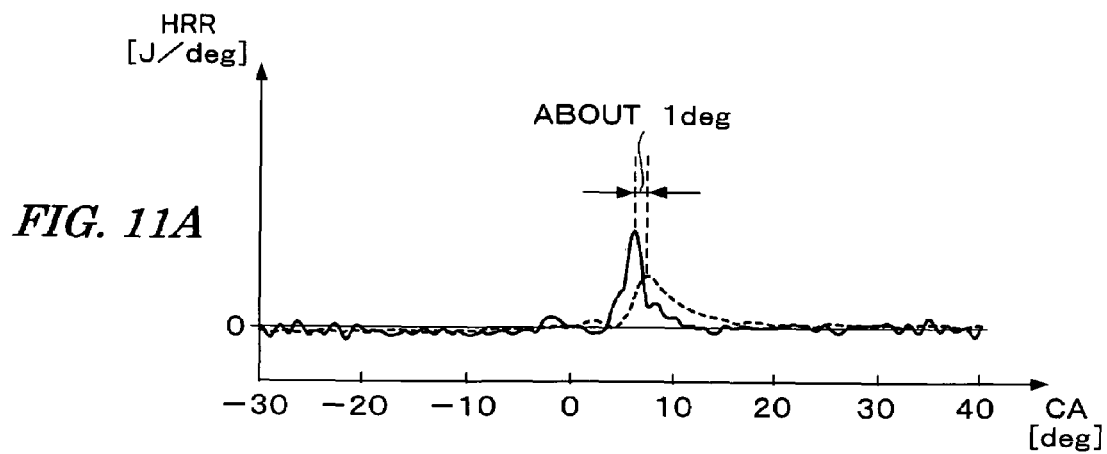
FIGS. 11A-11B show changes in the heat release rate (HRR) in a specific cylinder.
Figure 11B:
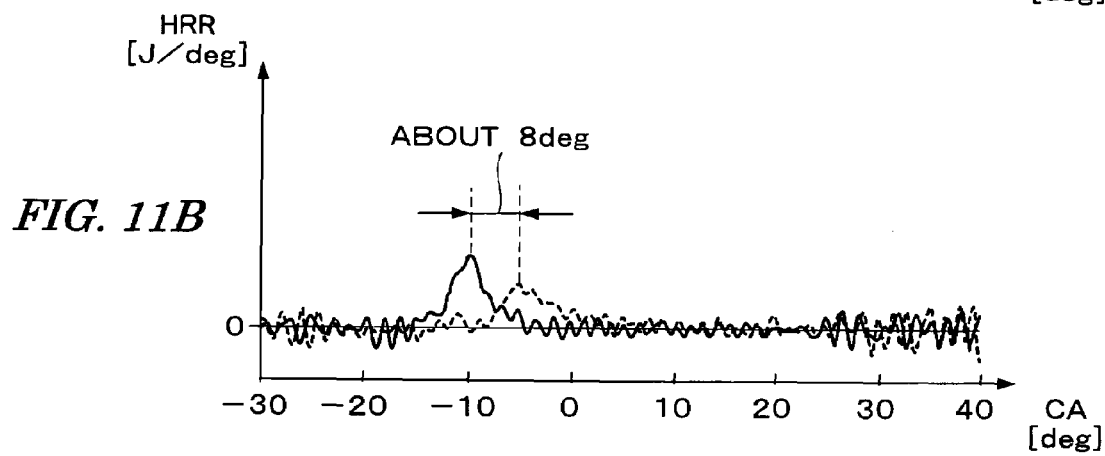

FIGS. 11A-11B show changes in the heat release rate HRR in the specific cylinder of the engine 1. The solid line corresponds to the fuel of a high cetane number (e.g., 57), and the dashed line corresponds to the fuel of a low cetane number (e.g., 41). The horizontal axis represents the crank angle CA wherein the crank angle CA is set to "0" when the piston is at the top dead center. FIG. 11A corresponds to a case where pilot and main injections are performed. In this case, the fuel injection is performed in the vicinity of zero degree of the crank angle (the top dead center), and the heat release rate HRR reaches a peak value at 5 to 10 degrees after the top dead center. The difference in the peak positions due to the difference in the cetane numbers is about 1 degree. FIG. 11B corresponds to a case where only the main injection is performed at an advanced fuel injection timing. In this case, the fuel injection is performed in the vicinity of −20 degrees of the crank angle (20 degrees before the top dead center), and the heat release rate HRR reaches a peak value at 5 to 10 degrees before the top dead center. The difference in the peak positions due to the difference in the cetane numbers is about 8 degrees. That is, by performing only the main injection (single injection) and advancing the injection timing, the difference in the ignition timings due to the difference in cetane numbers becomes significant which improves the calculation accuracy of the cetane number CET.

Further, when performing the single injection, the amount of hydrocarbon (HC) in exhaust gases tends to increase compared with the case where two or more injections are performed. A stuck fault of the EGR valve 26, blockage of the catalytic converter 28, and the like, become more likely to occur. However, such inconveniences are avoided by making the predetermined execution condition include a condition wherein the exhaust temperature TE is equal to or greater than a predetermined temperature TE0.

In the present embodiment, the fuel injection valve 6 corresponds to the fuel injection means. The exhaust temperature sensor 34, the coolant temperature sensor 36, and the oil sensor 37 correspond to the condition detecting means. The ECU 4 forms the fuel injection control means, the operation control means, and the cetane number estimation means. Specifically, the normal fuel injection control (not shown) performed by the ECU 4 corresponds to the fuel injection control means. Steps S13 and S14 of FIG. 3 correspond to the operation control means, and steps S14 to S17 correspond to the cetane number estimation means.

Modification 1

Figure 8:
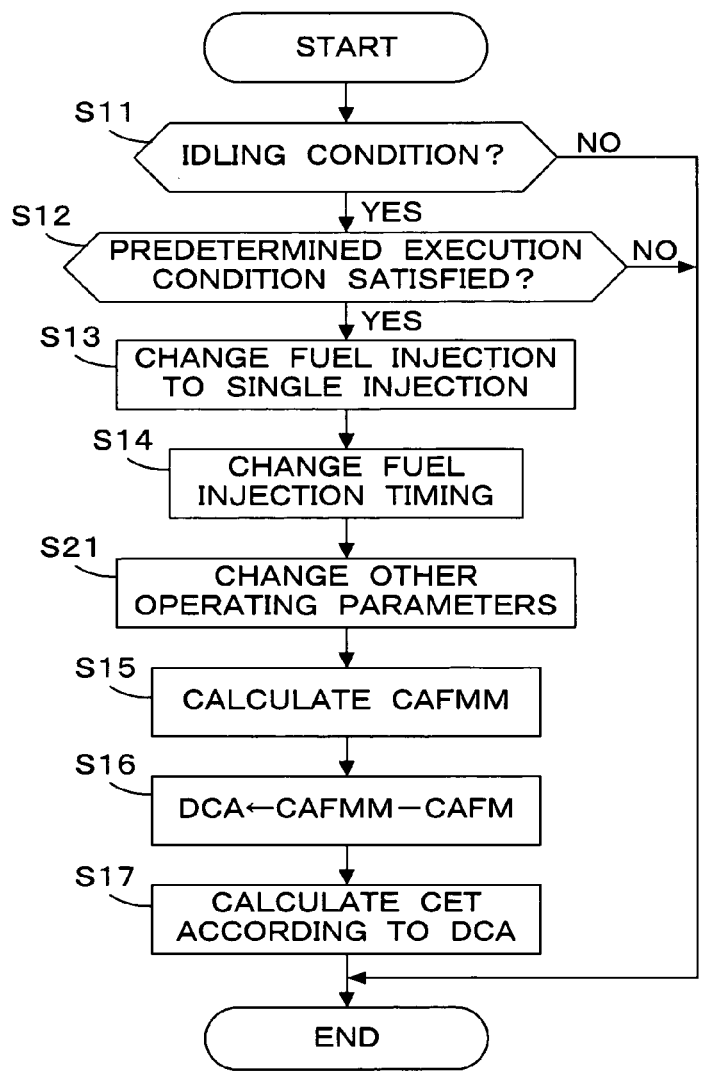
FIG. 8 is a flowchart showing a modification of the process shown in FIG. 3.

FIG. 8 is a flowchart showing a modification of the above-described process of FIG. 3. In this process, step S21 is added between steps S14 and S15. In step S21, one or more other operating parameters are changed. Specifically, any one, two, or all of the three steps described below are executed:

Step 1 includes reducing the target engine rotational speed in the idling condition by about 100 rpm, for example;

Step 2 includes controlling the throttle valve 22 in the closing direction to decrease the intake air flow; and Step 3 includes closing the EGR valve 26.

By changing the operating parameter(s), the difference in the actual ignition timings CAFM due to the difference in the cetane numbers becomes significant, and the estimation accuracy of the cetane number is improved.

When executing the above-described step 2, the throttle valve 22 is closed so that the detected intake air flow rate GA coincides with a desired value. Alternatively, a throttle valve opening TH is detected, and the throttle valve 22 is closed so that the detected throttle valve opening TH coincides with a predetermined opening.

FIG. 9A is a graph showing a relationship between the intake air flow rate GA and the actual ignition timing CAFM. In FIG. 9A, the square marks correspond to the fuel of cetane number "41", and the round marks correspond to the fuel of cetane number "57". When the intake air flow rate GA is equal to a first value GA1, the difference in the ignition timings is about 6 degrees. The difference in the ignition timings can be increased to about 10 degrees by decreasing the intake air flow rate GA to a second value GA2.

Further, by closing the EGR valve 26 to stop the exhaust gas recirculation, deterioration in the cetane number estimation accuracy due to the error of the air-fuel ratio is avoided, and the estimation accuracy is improved.

Step S21 in the above-described modification corresponds to a portion of the operation control means.

Modification 2

Alternatively, a condition of immediately after refueling may be included in the predetermined execution condition in step S12. That is, the cetane number estimation may not be performed unless the condition of immediately after refueling is satisfied, and the cetane number estimation may be performed only immediately after refueling. The condition of immediately after refueling is determined based on an increase in the indicated value of the fuel gauge, or opening and closing of the filler cap, and a change from an OFF state to an ON state of the engine switch.

In this modification, sensors (not shown) for determining whether the condition of immediately after refueling is satisfied are contained in the state detecting means.

Alternatively, the condition of the exhaust temperature TE, the coolant temperature TW, or the oil temperature TOIL may be removed from the above-described predetermined execution condition, and only the condition of immediately after refueling may be used as the predetermined execution condition.

Modification 3

When the engine does not have the throttle valve 22, the reduction in the intake air flow rate by means of the throttle valve 22 in Modification 1 cannot be performed. Therefore, in step S21, any one, or both, of steps 1 and 2 described below are performed:

Step 1 includes reducing the target engine rotational speed in the idling condition by about 100 rpm, for example; and Step 2 includes controlling the EGR valve 26 in the opening direction to decrease the intake air flow rate GA.

FIG. 9B is a graph showing a relationship between the intake air flow rate GA and the actual ignition timing CAFM. In FIG. 9B, the square marks correspond to the fuel of cetane number "41" and the round marks correspond to the fuel of cetane number "57". When the intake air flow rate GA is equal to the first value GA1, the difference in the ignition timings is about 6 degrees. The difference in the ignition timings is increased 8 degrees by opening the EGR valve 26 to decrease intake air flow rate GA to the second value GA2.

In this modification, the process for executing any one or both of the above-described steps 1 and 2 corresponds to a portion of the operation control means.

Second Embodiment

If the cetane number estimation process described above is performed immediately after high load operation of the engine, the accuracy of estimating the cetane number CET is reduced due to a high wall surface temperature of the combustion chamber. Therefore, in the present embodiment, the cetane number estimation process is performed taking the wall surface temperature of the combustion chamber into consideration.

Figure 12:
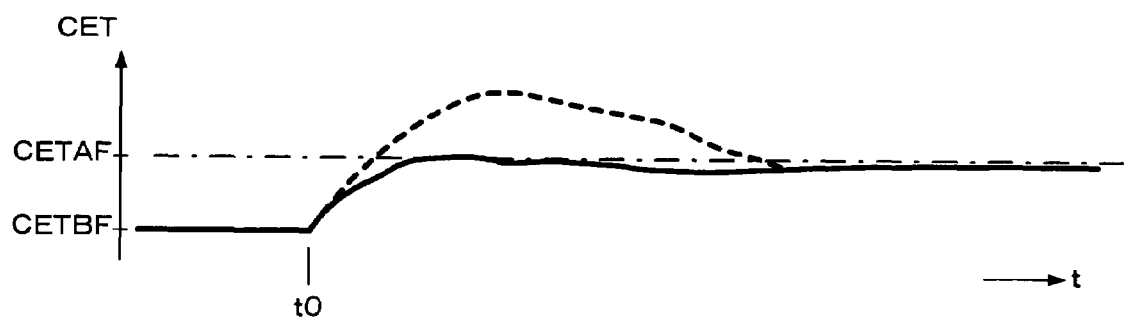
FIG. 12 is a time chart illustrating a problem that arises when the high load operation is performed before shifting to the idling condition.

FIG. 12 is a graph showing a transition of the estimated cetane number CET when performing the above-described cetane number estimation process from time t0 in a case where the cetane number of the fuel has changed after refueling from a before-refueling cetane number CETBF to an after-refueling cetane number CETAF. The solid line corresponds to a case where the wall surface temperature is low, i.e., the cetane number estimation is not performed immediately after the high load operation. The dashed line corresponds to a case where the wall surface temperature is high, i.e., the cetane number estimation is performed immediately after the high load operation. As shown in FIG. 12, if the cetane number estimation is not performed immediately after the high load operation, the estimated cetane number CET increases gradually from the before-refueling cetane number CETBF to a value which is substantially equal to the after-refueling cetane number CETAF. On the other hand, if the cetane number estimation is performed immediately after the high load operation, ignition of the fuel is easy. Accordingly, at first, the estimated cetane number CET becomes higher than the actual after-refueling cetane number CETAF and gradually converges on the after-refueling cetane number CETAF.

Therefore, in the present embodiment, the cetane number estimation process is performed if the execution condition, including the condition that the wall surface temperature is sufficiently low, is satisfied.

Figure 13:
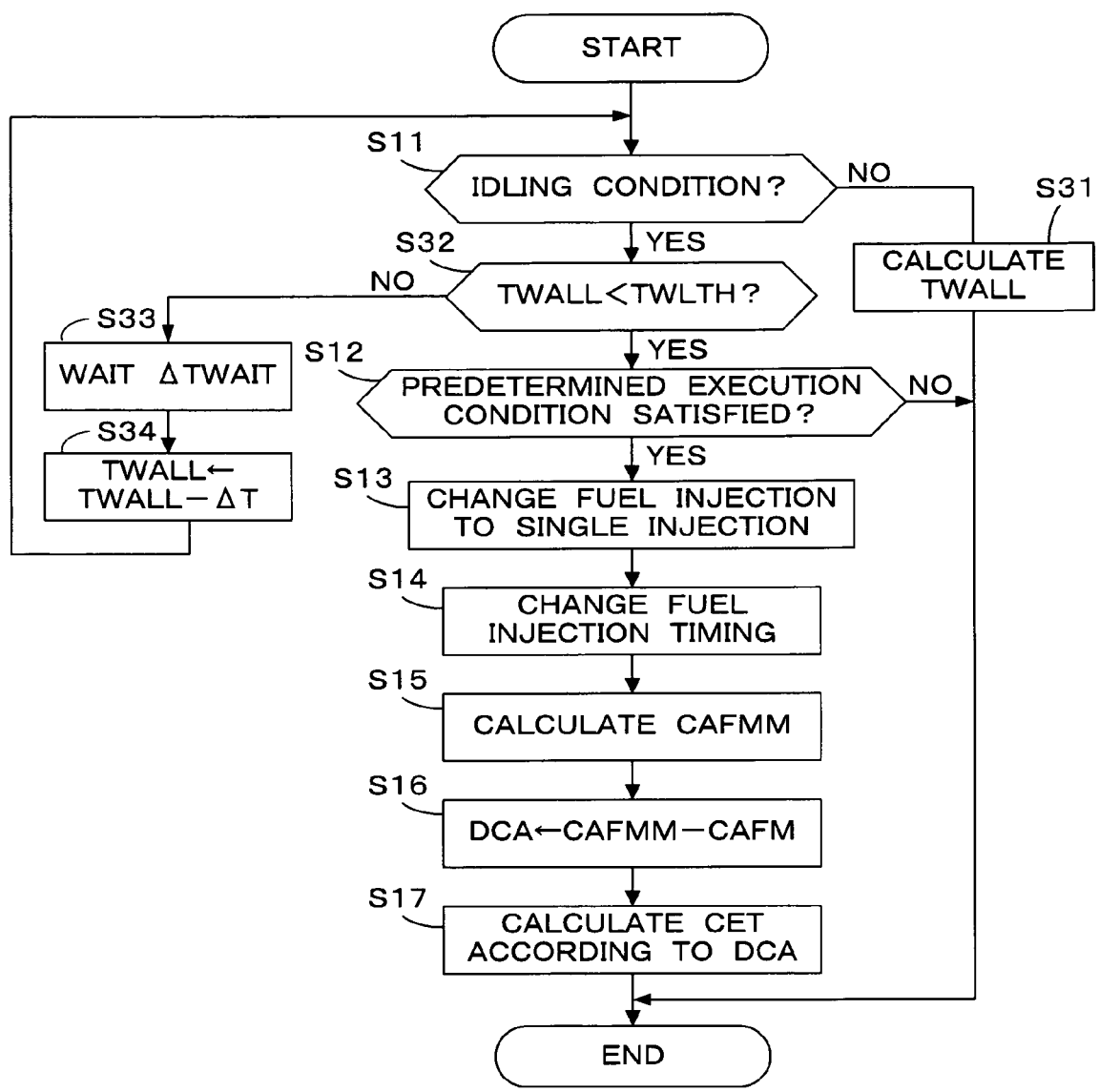
FIG. 13 is a flowchart showing a method of the cetane number estimation process according to a second embodiment of the present invention.

FIG. 13 is a flowchart showing a method of the cetane number estimation process in the present embodiment. The cetane number estimation process is obtained by adding steps S31 to S34 to the process of FIG. 3.

If the operating condition of the engine 1 is not in the idling condition, an estimated wall surface temperature of the combustion chamber TWALL (hereinafter referred to as "wall surface temperature") is calculated in step S31. Specifically, a basic value is calculated according to a fuel injection amount TOUT and the engine rotational speed NE, and the basic value is corrected according to the engine coolant temperature TW, the engine oil temperature TOIL, the exhaust temperature TE, and the intake air temperature TA to calculate the wall surface temperature TWALL.

If the operating condition of the engine 1 shifts to the idling condition, the process proceeds from step S11 to step S32, wherein it is determined whether the wall surface temperature TWALL is lower than a predetermined temperature TWLTH (e.g., 100 degrees Centigrade). If the answer to step S32 is affirmative (YES), the process proceeds to step S12.

In step S32, if TWALL is equal to or greater than TWLTH, the process waits a predetermined time period ΔTWAIT (e.g., 30 seconds) (step S33), to reduce the wall surface temperature TWALL by a set reduction amount ΔT (step S34). Thereafter, the process returns to step S11. The set reduction amount ΔT is set to a greater value as the wall surface temperature TWALL is higher.

Steps S32 to S34 are repeatedly executed. When the answer to step S32 becomes affirmative (YES), the process proceeds to step S12. If the predetermined execution condition is satisfied in step S12, steps S13 to S17 are executed to calculate the estimated cetane number CET.

According to the process of FIG. 13, when engine 1 is in an operating condition other than the idling condition, the wall surface temperature TWALL is calculated. After the engine operating condition shifts to the idling condition, the wall surface temperature TWALL is reduced by the predetermined reduction amount ΔT every time the predetermined time ΔTWAIT elapses. When the wall surface temperature TWALL becomes lower than a predetermined temperature TWLTH and the predetermined execution condition is satisfied, the cetane number estimation process is performed. Therefore, cetane number estimation is not performed until the wall surface temperature TWALL becomes lower than the predetermined temperature TWLTH when the operating condition directly shifts from the high load operation condition to the idling condition. Consequently, the cetane number of the fuel in use is prevented from erroneously being estimated to be higher than the actual cetane number, and the estimated cetane number CET is accurately calculated.

In this embodiment, step S13 of FIG. 13 corresponds to the initial wall surface temperature estimating means, step S34 corresponds to the gradually reducing means, and steps S31–S34 correspond to the wall surface temperature condition determining means.

Modification

Figure 14:
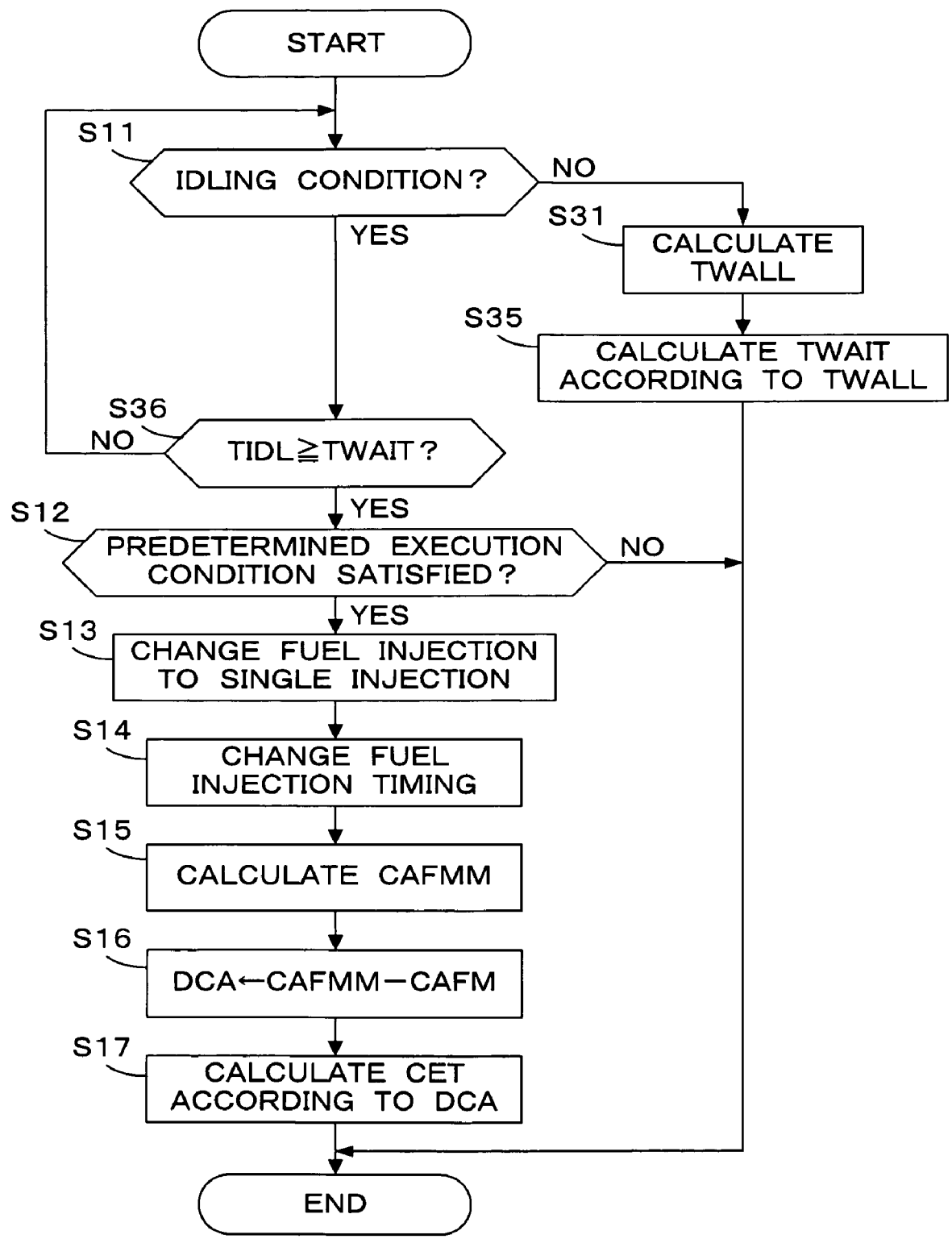
FIG. 14 is a flowchart showing a modification of the process shown in FIG. 3.

FIG. 14 is a flowchart showing a modification of the process shown in FIG. 13. This process is obtained by deleting steps S32 to S34 from FIG. 13 and adding steps S35 and S36.

In step S35, a TWAIT table (not shown) is retrieved according to the wall surface temperature TWALL to calculate a waiting time period TWAIT. The TWAIT table is set so that the waiting time period TWAIT becomes longer as the wall surface temperature TWALL becomes higher.

If the engine 1 shifts to the idling condition, the process proceeds to step S36 wherein it is determined whether the value of an upcount timer TIDL, measuring an elapsed time period from the time the engine operating condition, shifts to the idling condition is equal to or greater than the waiting time period TWAIT. If the answer to step S36 is negative (NO), the process returns to step S11. If the value of the timer TIDL reaches the waiting time period TWAIT, the process proceeds to step S12.

According to the process of FIG. 14, when the elapsed time period after shifting to the idling condition reaches the waiting time period TWAIT, which is set according to the wall surface temperature TWALL, it is determined that the wall surface temperature TWALL is lower than the predetermined temperature TWLTH. Then, if the predetermined execution condition is satisfied in step S12, the calculation of the estimated cetane number CET is performed. Therefore, estimation of the cetane number is not performed until the wall surface temperature TWALL becomes lower than the predetermined temperature TWLTH. Consequently, the cetane number of the fuel in use is prevented from erroneously being estimated to be higher than the actual cetane number, and the estimated cetane number CET is accurately calculated.

In this modification, step S13 of FIG. 13 corresponds to the initial wall surface temperature estimating means, step S35 corresponds to the waiting time period setting means, and steps S31, S35, and S36 correspond to the wall surface temperature condition determining means.

Fuel Injection Timing Suitable for Cetane Number Estimation

Figure 15A:
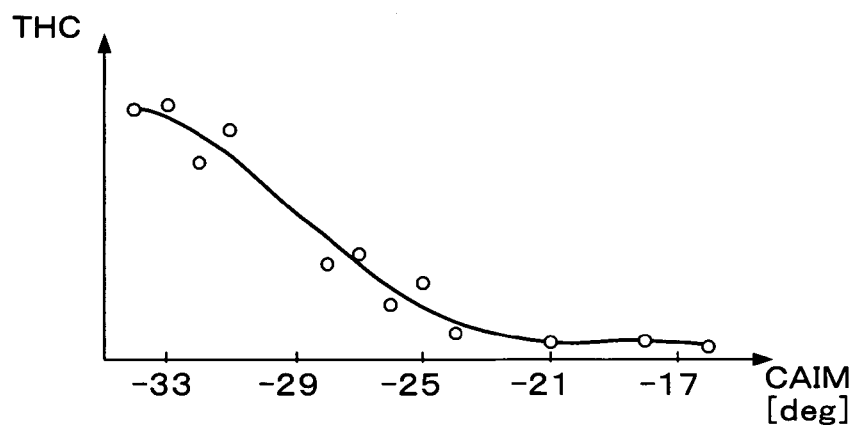
FIGS. 15A-15B show relationships between the fuel injection timing (CAIM) and an amount (THC) of HC emission.
Figure 15B:
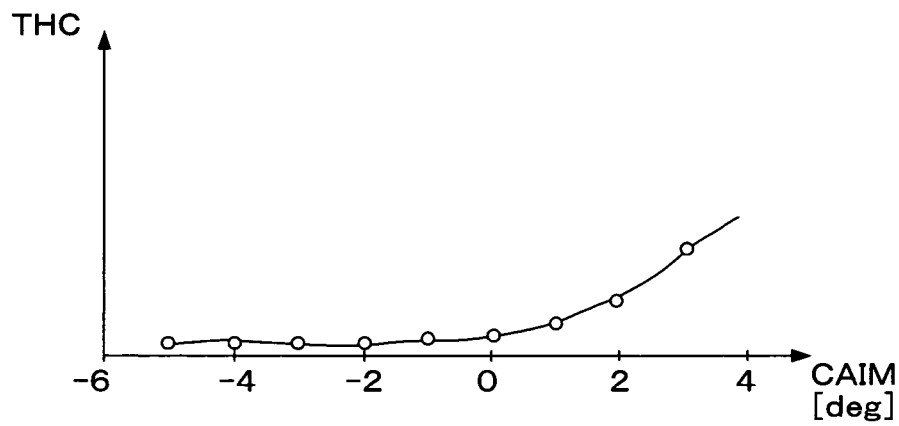

Next, the fuel injection timing suitable for estimating the cetane number will be described below. FIGS. 15A and 15B show relationships between the fuel injection timing CAIM (main injection timing) and an emission amount THC of HC (hydrocarbon) when performing the single injection. As apparent from FIG. 15A, the HC emission amount THC increases as the fuel injection timing CAIM is advanced. Accordingly, it is preferable to set the fuel injection timing CAIM to a value which is greater than −25 degrees, i.e., a value on the retarded side with respect to −25 degrees.

As is apparent from FIG. 15B, the HC emission amount THC increases as the fuel injection timing CAIM is further retarded from the top dead center (0 degree). Accordingly, it is preferable to set the fuel injection timing CAIM to a value which is less than 2 degrees, i.e., a value on the advanced side of 2 degrees.

FIGS. 16A and 16B show relationships between the fuel injection timing CAIM and the actual ignition timing CAFM'. The actual ignition timing CAFM' is defined so that the crank angle is equal to "0" degree when the piston is at the top dead center and takes a positive value on the advanced side of the top dead center. The round marks in FIGS. 16A and 16B correspond to the fuel of cetane number "54.5", and the square marks correspond to the fuel of cetane number "40.5".

On the advanced side of −20 degrees, the difference in actual ignition timings CAFM' due to the difference in cetane numbers is significant as shown in FIG. 16A, and the cetane number is accurately estimated. However, also referring to FIG. 16B, the difference in the actual ignition timings CAFM' due to the difference in cetane numbers is comparatively small in the range from −20 to 2 degrees. Accordingly, accurate estimation of the cetane number is difficult in this range.

From the above-described measured data, it is preferable to set the fuel injection timing CAIM upon performing the cetane number estimation so that the HC emission amount THC is equal to or less than a predetermined amount THCLH (e.g., 5 mg/sec), and the difference ΔCACET in the actual ignition timings CAFM' due to the difference in cetane numbers is equal to or greater than a predetermined value ΔCATH (e.g., 0.14 deg/cetane number). Specifically, it is preferable to set the fuel injection timing CAIM in the range R0 (from −25 to −20 degrees) as shown in FIG. 17. The ranges R1 and R2 shown in FIG. 17 correspond to the ranges where the HC emission amount THC is great, and the range R3 corresponds to the range where the difference in the actual ignition timings CAFM' due to the difference in cetane numbers is small.

By performing the cetane number estimation after setting the fuel injection timing CAIM in the range R0, the cetane number estimation is accurately performed by suppressing the HC emission amount THC below the predetermined amount THCLH. Setting the fuel injection timing CAIM accordingly is effective in both of the first and second embodiments described above.

In the embodiment described above, the actual ignition timing CAFM is detected as a timing at which the pressure change rate dp/dθ detected by the cylinder pressure sensor 2 exceeds the detection threshold value DPP. Alternatively, the timing at which the heat release rate reaches 50% of the maximum value may be determined as the ignition timing.

The cetane number estimation process may be performed with respect to only at least one cylinder of the engine 1, and normal combustion may be continued in the other cylinders. In this case, the processes shown in FIGS. 3, 8, 13, or 14 are executed with respect only to the cylinder which is set as the object of the cetane number estimation.

Further, the determination of the wall surface temperature condition (FIG. 13, steps S31 to S34; FIG. 14, steps S31, S35, S36) may be added to the modifications 1 to 3 of the first embodiment.

The present invention can be applied to a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine that has fuel injection means for injecting fuel into a combustion chamber of said engine, and burns the injected fuel by compressing an air-fuel mixture in said combustion chamber, said control system comprising:
    condition detecting means for detecting an operating condition of said engine, and/or a refueling condition of a fuel tank for supplying fuel to said engine;
    fuel injection control means for controlling said fuel injection means;
    operation control means for changing at least one operating parameter of said engine when at least one of the engine operating condition and the refueling condition detected by said condition detecting means satisfies a predetermined condition in a predetermined low load operating condition of said engine; and
    cetane number estimating means for estimating a cetane number of the fuel in use according to an ignition timing of the fuel detected after changing the at least one operating parameter of said engine.

2. The control system according to claim 1, wherein said fuel injection control means performs a plurality of fuel injections per one combustion cycle in one cylinder, and wherein said operation control means decreases a number of fuel injections that are performed when the predetermined condition is satisfied.

3. The control system according to claim 2, wherein said operation control means changes a timing of the fuel injection performed by said fuel injection means when the predetermined condition is satisfied.

4. The control system according to claim 1, further comprising wall surface temperature condition determining means for determining a wall surface temperature condition wherein a wall surface temperature of said combustion chamber is in a predetermined temperature range in the predetermined low load operating condition,
    wherein the predetermined condition includes the wall surface temperature condition.

5. The control system according to claim 4, wherein said wall surface temperature condition determining means includes initial wall surface temperature estimating means for estimating an initial wall surface temperature based on an engine operating condition immediately before the engine operating condition shifts to the predetermined low load operating condition, and gradually reducing means for gradually reducing the initial wall surface temperature after the engine operating condition shifts to the predetermined low load operating condition, and determines that the wall surface temperature condition is satisfied when the temperature output from said gradually reducing means is in the predetermined temperature range.

6. The control system according to claim 4, wherein said wall surface temperature condition determining means includes initial wall surface temperature estimating means for estimating an initial wall surface temperature based on an engine operating condition immediately before the engine operating condition shifts to the predetermined low load operating condition, waiting time period setting means for setting a waiting time period according to the initial wall surface temperature, the waiting time period being a time period from the time the engine operating condition shifts to the predetermined low load operating condition to the time the wall surface temperature condition is satisfied, and determines that the wall surface temperature condition is satisfied when the waiting time period has elapsed from the time the engine operating condition shifts to the predetermined low load operating condition.

7. A control system for an internal combustion engine that has fuel injection means for injecting fuel into a combustion chamber of said engine, and burns the injected fuel by compressing an air-fuel mixture in said combustion chamber, said control system comprising:
    fuel injection control means for controlling said fuel injection means;
    actual ignition timing detecting means for detecting an actual ignition timing of the fuel injected by said fuel injection means; and
    cetane number estimating means for estimating a cetane number of the fuel in use according to the detected ignition timing, wherein said fuel injection control means sets a fuel injection timing of said fuel injection means so that a difference in the actual ignition timings due to a difference in cetane numbers of the fuel is equal to or greater than a predetermined value when said cetane number estimating means performs the cetane number estimation.

8. The control system according to claim 7, wherein said fuel injection control means sets the fuel injection timing of said fuel injection means wherein an amount of hydrocarbon emitted from said engine is equal to or less than a predetermined amount when said cetane number estimating means performs the cetane number estimation.

9. The control system according to claim 8, wherein said fuel injection control means sets the fuel injection timing of said fuel injection means in a range of a crank angle from 20 to 25 degrees before the crank angle at which a piston corresponding to said combustion chamber reaches the top dead center when said cetane number estimating means performs the cetane number estimation.

10. A control method for an internal combustion engine that has at least one fuel injection valve for injecting fuel into a combustion chamber of said engine, and burns the injected fuel by compressing an air-fuel mixture in said combustion chamber, said control method comprising the steps of:
  a) detecting an operating condition of said engine and/or a refueling condition of a fuel tank for supplying fuel to said engine;
  b) changing at least one operating parameter of said engine when at least one of the engine operating condition and the refueling condition detected by said condition detecting means satisfies a predetermined condition in a predetermined low load operating condition of said engine; and
  c) estimating a cetane number of the fuel in use according to an ignition timing of the fuel detected after changing the at least one operating parameter of said engine.

11. The control method according to claim 10, wherein a plurality of fuel injections per one combustion cycle in one cylinder are performed, and a number of times the fuel injection is performed is decreased when the predetermined condition is satisfied.

12. The control method according to claim 11, wherein a timing of the fuel injection performed by said fuel injection valve is changed when the predetermined condition is satisfied.

13. The control method according to claim 10, further including the step of determining a wall surface temperature condition that a wall surface temperature of said combustion chamber is in a predetermined temperature range in the predetermined low load operating condition,
  wherein the predetermined condition includes the wall surface temperature condition.

14. The control method according to claim 13, wherein the step of determining the wall surface temperature condition includes the steps of:

i) estimating an initial wall surface temperature based on an engine operating condition immediately before the engine operating condition shifts to the predetermined low load operating condition;
  ii) gradually reducing the initial wall surface temperature after the engine operating condition shifts to the predetermined low load operating condition; and
  iii) determining that the wall surface temperature condition is satisfied when the reduced initial wall surface temperature is in the predetermined temperature range.

15. The control method according to claim 13, wherein the step of determining the wall surface temperature condition includes the steps of:
  i) estimating an initial wall surface temperature based on an engine operating condition immediately before the engine operating condition shifts to the predetermined low load operating condition,
  ii) setting a waiting time period according to the initial wall surface temperature, the waiting time period being a time period from a time the engine operating condition shifts to the predetermined low load operating condition to a time the wall surface temperature condition is satisfied; and
  iii) determining that the wall surface temperature condition is satisfied when the waiting time period has elapsed from the time the engine operating condition shifts to the predetermined low load operating condition.

16. A control method for an internal combustion engine that has at least one fuel injection valve for injecting fuel into a combustion chamber of said engine, and burns the injected fuel by compressing an air-fuel mixture in said combustion chamber, said control method comprising the steps of:
  a) setting a fuel injection timing of said at least one fuel injection valve so that a difference in actual ignition timings due to a difference in cetane numbers of the fuel is equal to or greater than a predetermined value;
  b) detecting an actual ignition timing of the fuel injected by said at least one fuel injection valve; and
  c) estimating a cetane number of the fuel in use according to the detected ignition timing.

17. The control method according to claim 16, wherein the fuel injection timing of said at least one fuel injection valve is set so that an amount of hydrocarbon emitted from said engine is equal to or less than a predetermined amount when the cetane number estimation is performed.

18. The control method according to claim 17, wherein the fuel injection timing of said at least one fuel injection valve is set in a range of the crank angle from 20 to 25 degrees before a crank angle at which a piston corresponding to said combustion chamber reaches the top dead center when the cetane number estimation is performed.

* * * * *